United States Patent [19]

Stich et al.

[11] Patent Number: 5,156,504
[45] Date of Patent: Oct. 20, 1992

[54] MACHINE TOOL FLUID-FEED ASSEMBLY WITH DISTRIBUTING VALVE

[75] Inventors: Bodo Stich, Wiesbaden; Reiner Lindroth, Köngernheim, both of Fed. Rep. of Germany

[73] Assignee: Glyco-Antriebstechnik GmbH, Wiesbaden, Fed. Rep. of Germany

[21] Appl. No.: 715,917

[22] Filed: Jun. 14, 1991

[30] Foreign Application Priority Data

Jul. 12, 1990 [DE] Fed. Rep. of Germany ....... 4022190

[51] Int. Cl.$^5$ ............................................. B23G 11/10
[52] U.S. Cl. ............................ 409/136; 137/625.46;
  137/869; 251/59; 408/56
[58] Field of Search ..................... 408/56, 57, 59, 61;
  409/135, 136; 251/59, 283; 137/625.46, 869,
  874, 876; 279/20

[56] References Cited

U.S. PATENT DOCUMENTS

| 3,875,967 | 4/1975 | deFries | 251/283 |
| 4,372,337 | 2/1983 | Holzenberger | 137/874 |

FOREIGN PATENT DOCUMENTS

| 1029699 | 5/1966 | United Kingdom. | |
| 1510086 | 5/1978 | United Kingdom | 408/57 |

Primary Examiner—Daniel W. Howell
Attorney, Agent, or Firm—Herbert Dubno

[57] ABSTRACT

A rotary feed system for a machine tool capable of feeding, for example, an off-center or a centrally-supplied tool with a coolant, has at the downstream end of a shaft delivering a fluid medium, a rotary distributing valve which is actuated by a fluid, e.g. compressed air applied to one or two vanes of the rotary piston within a generally annular or segmental working compartment.

13 Claims, 4 Drawing Sheets

MACHINE TOOL FLUID-FEED ASSEMBLY WITH DISTRIBUTING VALVE

FIELD OF THE INVENTION

Our present invention relates to a machine tool assembly for supplying a flowable medium to a work site and, more particularly, to an assembly in a machine tool which comprises a stationary machine part, a machine part which is rotatable relative to the stationary machine part and having a shaft rotatable about the axis of rotation and which is hollow to serve as a supplier of a flowable medium, e.g. a lubricating, cooling or cutting medium.

More specifically the invention relates to an assembly of this type having a source of the medium at an upstream location along the shaft in the stationary part of the machine and, at a front end or downstream location of the shaft with respect to the medium flow direction, a connecting flange.

BACKGROUND OF THE INVENTION

Machine tools having a spindle housing in which a shaft is journaled for rotation and to which a tool can be affixed are in common use. For example, the tool may be a borer or drill received in a tapered socket and driven, by its coupling with the shaft, at high connecting speeds. Other tools of this type may be end mills, milling cutters in general, shaping tools and the like.

It is important, depending upon the application of the machine, to be able to deliver coolant with high pressure and preferably at various locations to the machining site and to various parts of the tool while nevertheless allowing the tool to be rotated at high rotary speeds. The coolant can also serve to carry away the machining detritus, such as chips, turnings and the like.

For this purpose it is known to provide at the rear end of the spindle housing, a coolant supply system or line which is provided with a rotary connection to the shaft or to the rotating member of the system, e.g. a tool. The shaft may have a flange which rotates with the tool and to which the tool is connected. Within this liquid supply system, a passage is commonly provided for delivering the coolant to the tool, e.g. a drill bit or boring tool and communicating centrally therewith.

It has already been proposed to provide in a conical shaft system having a socket or a tool, an off-center opening for the coolant or lubricating liquid so that corresponding types of tools can be fed with the liquid. In other words, somewhat newer tools generally have an off-center coolant/lubricant passage requiring an off-center supply passage in the socket or rotating part of the assembly while older tools continue to have the central passage which must be supplied through a central passage in the rotating part.

For machine tool manufacturers, this poses a problem since the machine tool must be equipped for one or the other of these two types of tools which may be used and either with the new off-center supply or with the old central supply.

In the past, it has been difficult, if not impossible, to reconstruct a machine tool built for one type of tool to accommodate the other type.

OBJECTS OF THE INVENTION

It is, therefore, the principal object of the present invention to provide a rotary connection for supplying a liquid medium to a tool, in a machine tool, so that either type of tool can be selectively accommodated therein, i.e. a flowable medium can be delivered to the tool either for central delivery or for off-center delivery.

Another object of the invention is to provide a machine tool assembly capable of supplying the flowable medium to a rotating system alternatively via different passages so that central or off-center coolant feed may be selected as desired.

Yet another object of this invention is to provide an assembly for the purposes described which allows switchover of the coolant/lubricant medium between passages associated respectively with off-center and central feed.

SUMMARY OF THE INVENTION

These objects and others which will become apparent hereinafter, in accordance with the invention, are attained by providing two different passages at the downstream end of the hollow shaft, respectively serving for one or the other of the feed types, and incorporating in or at the downstream end of the shaft a distributing valve for selectively and, if desired, alternatively, switching over the feed from one to the other passage.

We should mention that there have been systems devised which provide outside the rotating structure for the region of the rotating part, a distributing valve which can alternatively feed a flowable medium to one or another passage in the rotating structure, but that these systems have never been found to be effective at high pressures in applications of the type contemplated with the present invention.

More particularly, a machine tool assembly for supplying a flowable medium can comprise:

a stationary machine part;

a hollow shaft member rotatable about an axis of the shaft member in the stationary machine part;

means on the stationary machine part for feeding the flowable medium to an upstream end of the hollow shaft member whereby the flowable medium flows toward a downstream end of the shaft member for delivery;

a connection flange member affixed to the downstream end of the hollow shaft member and rotatable therewith for connection of a tool to the assembly, at least one of the members being formed with two outlets selectively receiving the flowable medium; and means on the stationary machine part for feeding the flowable medium to an upstream end of the hollow shaft member whereby the flowable medium flows toward a downstream end of the shaft member for delivery;

a connection flange member affixed to the downstream end of the hollow shaft member and rotatable therewith for connection of a tool to the assembly, at least one of the members being formed with two outlets selectively receiving the flowable medium; and a fluid-actuated rotary distributing valve in a region of the connection flange member and interposed between the hollow shaft member and the outlets and angularly displaceable for connecting a selected one of the outlets to the downstream end of the hollow shaft member in response to a fluid pressure applied to the distributing valve.

According to a feature of the invention, the connecting flange at the downstream end of the hollow shaft and/or the hollow shaft itself at its downstream end is provided with a fluid-actuated rotary distributing valve. The distributing valve is thus located in the rotating part of the assembly and the switchover is effected by a rotary actuation of this valve, namely by a control fluid pressure. Both the rotary feed assembly and its shaft, as well as the connecting flange, are rotating machine parts and receive a rotary distributing valve so that the rotary supply device can advantageously have one inlet for the flowable medium to be delivered to the machining site and two outlets, one outlet for central supply tools and the other outlet for off-center supply tools.

The rotary distributing valve enables alternative switching of the inlet to one or the other outlet. It will be understood, of course, that a multiplicity of outlets or outlet groups can be provided and the rotary distributing valve, constructed in accordance with the principles of the invention, can have respective alternative outlet connections.

In the system of the invention where there is a single channel transfer of the flowable medium for the stationary region to the rotary region of the assembly and the switchover is effected only within the rotary region, we have been able to provide a rotary supply of the liquid capable of handling high pressures of, for example, 100 bar, and operating speeds of 10,000 to 20,000 or more r.p.m.

In addition, the rotary feed system of the invention can also operate dry, i.e. the operation of the system is not dependent upon a continuous supply of the flowable medium.

The switchover from central flowable medium supply to decentral or off-center flowable medium supply and the reverse is effected preferably at standstill of the machine and the rotary feed shaft, although it can also take place during rotation thereof.

By way of example, we may initially shut down the machine for a tool change, remove the old tool, and during the gradual reduction in speed, toward stopping, the switchover can be effected on the slowly rotating shaft to a tool of the other type, whereupon the machine drive is switched on again. This mode of operation reduces the down time.

It is possible according to the invention to provide the rotary distributing valve as a rotary piston which is angularly displaceable in the downstream end of the shaft about the axis of rotation thereof and to form this piston with at least one flow passage inclined to this axis, the piston having at least one vane formation which is exposed to fluid pressure in a compartment which is generally annular and is formed between the periphery of the rotary piston and the inner surface of the downstream shaft end.

The shaft itself is journaled in the machine housing or stationary part so that it can rotate with high speeds. This allows the machine tool to accommodate tools which themselves can operate with extremely high speeds. During normal operation and after selection of one fluid supply path or the other by rotation of the piston, the piston remains in position within the shaft and thus does not rotate relative to it, but rather rotates with the shaft, and in normal operation is stationary with respect to the shaft.

The construction of the piston allows this angular displacement independently of the speed of the shaft or the piston, i.e. by a relative rotation of the shaft and the piston.

The flow medium path extends through the shaft and this piston and, depending upon the requirements at the machining site, various kinds of flow media can be supplied or the flow medium can be broken up into a variety of partial streams. It is also possible to provide a plurality of medium flow paths in the rotary piston. Where a plurality of such flow paths is provided in a rotary piston, these can also extend at an inclination of the axis of rotation of the shaft, the angle of inclination determining the pitch circle of the outlet in the connection flange to which the inclined passage is connected or with which the inclined passage is in communication.

Since one end of this passage may be disposed centrally, usually its inlet end, the axis of this passage will generally intersect the axis of the shaft at a point. At the opposite end of the passage, an outlet port or communication to the outlet of the flange can be provided, taking into consideration different possible positions of the outlet and, of course, different peripheries of the flange and any tool connected therewith.

The drive of the rotary piston is preferably effected fluidically. Fluid under pressure, especially compressed air, is introduced into the working compartment to press against the vane of the rotary piston and rotate the rotary piston within the shaft in one or the other sense.

It has been found to be advantageous, in accordance with the invention, to provide in a part of the working compartment, at least one sealing element which can be applied against the inner surface of the shaft. In the region of this element, two liquid feed ducts can open, preferably being sealed from one another.

The sealing element thus constitutes on the one hand a local boundary of the working compartment and, on the other hand, as an abutment against which the vane formation on the rotary piston can abut at reaching its end position. When the sealing element functions as an abutment, it should be correspondingly constructed so that it does not lose other functions because of frictional deterioration or the like. It is especially important that it should not lose its sealing function.

The sealing element or bar serves, in addition, to separate two fluid feed lines from one another, the fluid feed lines forming part of the fluid control system for the rotary piston. Other sealing means between the fluid feed lines which, upon pressurization, rotate the piston in one or the other sense, can also be used.

The fluid flows via these lines into the compartment behind the vane formation and drives the vane and the piston entrained thereby angularly about the axis of the rotary distributor in a forward sense until the rotary piston hits an abutment or stop, for example, the other side of the sealing bar or element or some other stop in the path of the vane. The vane in the case in which a single vane is provided and cooperates with the sealing bar as a stop, thus causes the rotary piston to move angularly through a path which can significantly exceed 180°.

In practice, however, we provide an embodiment in which the vane does not directly engage the sealing bar as a stop or abutment but rather engages a separate abutment which can be spaced from the end of the sealing bar so that an opening of a fluid control passage into the compartment can be formed between this end of the sealing bar and the abutment.

It has been found to be advantageous, in accordance with the invention, for the rearwardly disposed sealing face of the rotary piston, with respect to the flow direction of the medium through the distributor, to have a greater surface area than its forward sealing face or surface. This feature provides two surprising advantages. The first is the axial sealing. Because of the area ratio of the two effective sealing surfaces of the rotary piston, i.e. the sealing surfaces formed by the end faces, the force of the components generated by the pressure of the medium on these surfaces, ensure that there will be an net force in the direction of the connecting flange which is greater than the force in the opposite direction. As a consequence, the rotary piston is pressed with its front end face against the sealing flange and maintains a good seal thereagainst. At this location, no flowable medium should escape because otherwise the sealing pressure in the direction of the net force component may be too small and the rotary piston permitted to lift off the sealing flange. The configuration of the front face of the rotary piston should thus be correspondingly selected to prevent any leakage at its engagement with the flange.

The second advantage is the position stabilization of the rotary piston, i.e. the retention of the rotary piston, after it has been rotated to select one of its end positions, even during acceleration of the shaft.

When the machine tool is switched on, the shaft of the distributor is accelerated to cutting speed so that the rotary piston would normally be expected on theoretical grounds and based upon the principles of inertia, to lag the shaft within which the rotary piston is rotatable. This, of course, would result in a relative rotation of the rotary piston in the shaft and a change in the position of the rotary piston from the previous selection effected by the flowable medium.

However, because of the differential piston effect resulting from the ratio of the surface areas of the piston exposed to the flowable medium at the front and back of the rotary piston, a net axial force is applied to the rotary piston to functionally retain the latter against the flange even during acceleration of the shaft. This friction force exerts a braking function on the rotary piston relative to the shaft and thereby prevents inertial lag of the rotary piston upon acceleration. Thus, while the rotary piston is readily accessible upon removal of the flange from the shaft and can be freely rotatable therein at low pressures of the flowable medium to permit switching between the positions of the rotary piston and the pathways to which the flowable medium is to be delivered by the control fluid, so that control pressures need not be excessive, there nevertheless is no inertial lag of the rotary piston during acceleration and deceleration of the machine shaft.

The retention of the rotary piston and hence its switchover between its extreme angular positions normally is effected during shut-off of the flowable medium. When the flowable medium pressure is withdrawn, the pressing force with which the rotary piston is urged against the flange is eliminated so that the braking force is removed as well and the rotary piston can be displaced by the control pressure easily into one or the other of its angular positions.

It is self understood that during retention of the rotary piston in the correct position by the axial force of the flowable medium, the flowable medium passage in the rotary piston should be in communication with the correct outlet in the flange.

According to a particularly advantageous further feature of the invention, the fluid supply passages in the rotating machine part (for the control fluid) are connected via radial rotating pathways with fluid connections in the stationary machine part separated by gap seals through which limited leakage can occur. In this fashion we are able to deliver the energy required for displacement of the return piston relative to the shaft in a simple manner from the stationary machine part to the rotating machine part.

In many cases the shaft is journaled in the stationary machine part with slight play between the housing of the shaft apart from those areas in which bearings are provided and the rotary connections described which may be provided between the shaft and the housing by annular grooves formed in cylindrical surfaces thereof can accommodate the delivery of the control fluid without requiring direct contact. The gap seals between the annular grooves also accommodate the contactless juxtaposition of the rotating and stationary machine parts in the region in which the control fluid is supplied to the rotating shaft.

It has been found to be advantageous to provide the rotary piston with a recess serving a balancing function, this recess being formed in the rotary piston in addition to the flowable medium passage. The inclined orientation of the flowable medium passage imparts to the rotary piston a certain eccentricity of the weight of the rotary piston and thus some balance so that the center of gravity of the rotary piston would be considered to lie along the axis of rotation thereof.

By providing this recess at an appropriate location, we can move the center of gravity of the rotary piston back to its axis so that balanced rotation of the rotary piston can be assured when the shaft is rotating at high speed about its axis.

Since more than one medium flow passage may be provided in the rotary piston, it is also conceivable that additional recesses must be provided therein to compensate for any imbalance. The elimination of imbalance in the presence of the flowable medium is important in that it is necessary or desirable to position the recess to compensate for any imbalance when the flowable medium passage is filled with the flowable medium or to provide the recess so that it also will fill with the flowable medium in appropriate cases. By elimination of any imbalance in this manner, the stability at high speeds of the system is significantly increased.

It has also been found to be advantageous, according to the invention, to provide the abutment pin which projects into the working compartment of an elastically damping material. Here two distinct embodiments may be contemplated. In the first embodiment, the rotary piston has a single radial vane and this embodiment can thus be referred to as a single vane embodiment or system. In this embodiment, the angular displacement range of the vane can be substantially in excess of 180° as noted above. In this embodiment only one sealing bar is required and the two control fluid passages can open into the compartment adjacent this bar and on opposite sides thereof. The stop pin can thus be provided with spacing from the ends of the bar and can be metal pins. The control fluid passages then open between each abutment or stop and the sealing location of the single sealing bar.

In this configuration, the angular displacement range can be increased for the rotary piston and the vane by milling or bevelling an end region of the sealing bar can allow the control fluid passages to open in part beneath or behind the sealing bar.

In another embodiment, the rotary piston can have two vane formations at diametrically opposite sides of its periphery and the embodiment can be referred to as a double-vane embodiment. This embodiment allows, with approximately the same external dimensions as in the first embodiment, a doubling of the switching force, i.e. the force applied to the rotary piston to select between the outlets, thereby enabling the switching function to be made more reliable.

It is known that in most machine tool plants the supply of compressed air which can here be used as the control fluid may vary widely in pressure and that at certain times and at certain locations, the pressure may drop substantially. With pressure fluctuations between say 3 and 6 bar, the switchover time of a single vane system can become excessive, i.e. switching can be delayed. At excessively low values of the available compressed air, the switching force may not be sufficient. This force is, as is known, the product of the area and the pressure and by doubling the number of vanes, it is possible to double the area and thus the force.

In this embodiment, not only do we provide two vane formations, but within the shaft at two diametrically opposite sides, we can provide two sealing bars or elements having constructions as described previously. With a double-vane embodiment, therefore, there are also two pairs of openings for the control fluid passages into the compartment, each sealing bar having one pair of such openings associated therewith.

It is advantageous with a rotary piston having two vane formations to maximize the angular displacement and thus to make the working compartment as large as possible, although the rotation about 180 or more from one end position of the rotary piston into the other, is not possible. In this case, the abutment should be formed by the ends of the sealing bars or as close to these ends as possible and it therefore advantageous to provide directly adjacent each sealing bar and in contact with an outer end, a single abutment pin of elastically damping material. This material can advantageously be a polyamide. The abutment pin can have the configuration of a bolt which is braced on an end of a sealing bar and thus cannot be sheared off even by strong impacts from the rotary piston. In this manner a double-vane drive can be operated reliably.

In a double-vane system it may be desirable to allow the limited angular displacement of the rotary piston to effect a fluid distribution which appears to correspond to 180°. Under these circumstances, it is advantageous to provide elongated recesses in the rotary piston or in the flange to compensate for the inability to rotate the rotary piston through this angular displacement. These elongated recesses may be generally kidney shaped.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
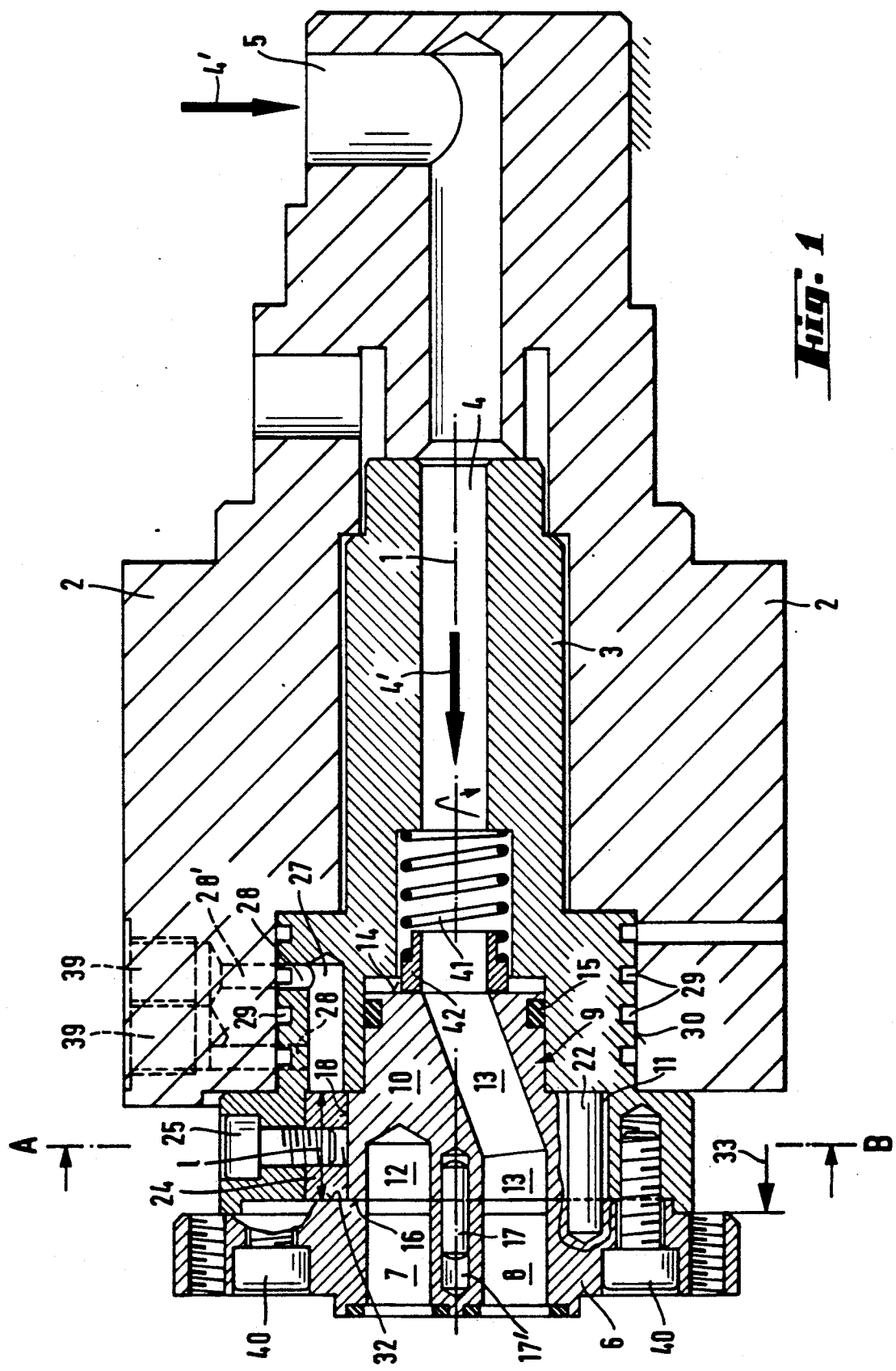
FIG. 1 is a schematic axial cross sectional view of an assembly according to the invention in which the flowable medium is supplied from the right and delivered to a tool at the left-hand side of the device and in which certain elements are shown angularly offset from their positions in FIG. 2.

The rotary fluid feed assembly illustrated in FIG. 1, according to the invention, has been shown in longitudinal section and comprises a machine-fixed housing 2 forming the stationary machine part, with respect to which a shaft 3 is rotatable about an axis 1 as the rotating machine part and is traversed by the fluid medium to be delivered, e.g. to a tool affixed at the left-hand end of the assembly as shown in FIG. 1. Extending centrally through the shaft 3 is a single passage 4 for the flowable medium, e.g. a cooling liquid which is to be delivered to the tool. The latter can be a drill bit, boring tool or milling cutter which can be mounted on a tool holder which, in turn, is affixed to a connecting flange 6 affixed on the left-hand or downstream end of the shaft 3.

At the right-hand side of FIG. 1, it is possible to see an inlet fitting 5 to which a source of the flowable medium can be connected, this flowable medium being delivered in the direction of the arrow 4'. This end constitutes the upstream end of the shaft 3 and the system. At the left-hand, front or downstream end, the flange 6 is provided with its two outlets 7 and 8.

The cooling liquid serving as the flowable medium flows as illustrated in FIG. 1 in the direction of the arrows 4' from right to left. The cross sectional views of FIGS. 2 and 3 are taken in the direction of the axis 1, but the direction of view is counter to the medium flow direction 4'.

In the flow medium supply shaft 3, there is provided, apart from the connecting flange 6, a fluid-operated rotary distributing valve generally represented at 9. The important parts of this valve are visible in detail in FIGS. 2 and 3. The rotary distributing valve 9 can partly extend into the connecting flange 6 although in the simplified embodiment shown in the drawing, the entire rotary valve is located upstream of the flange. Specifically the entire rotary valve 9 is located at the downstream end of the shaft 3.

Figure 2:
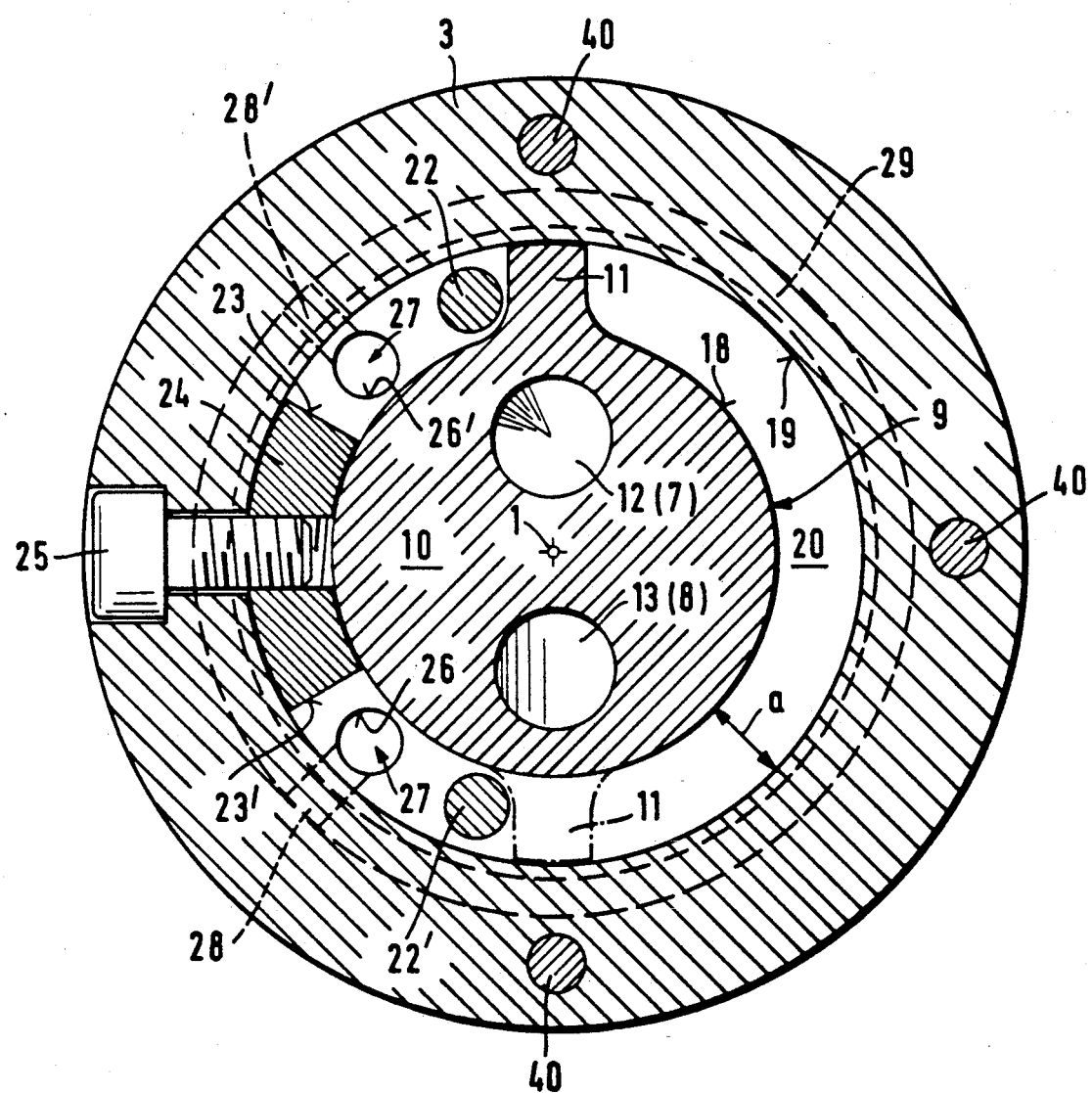
FIG. 2 is a section taken along the line A-B of FIG. 1.
Figure 3:
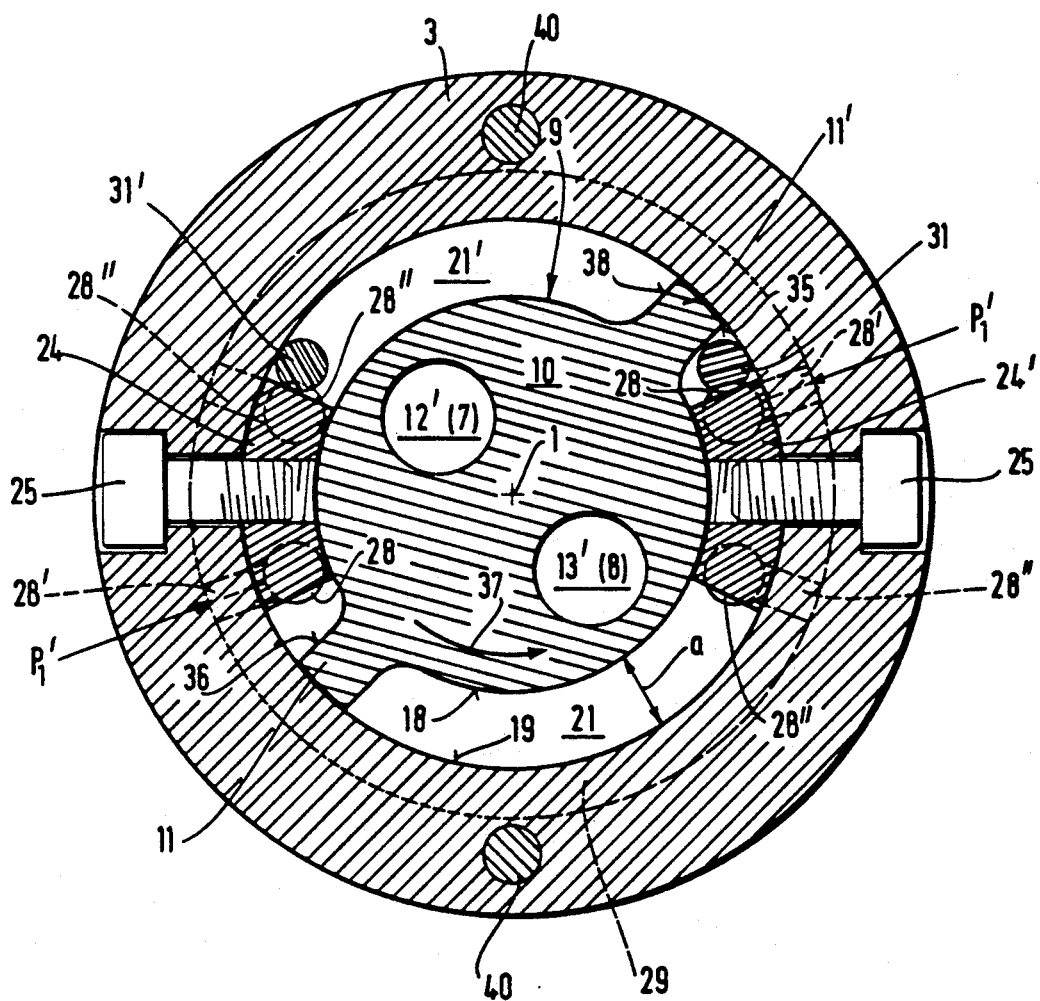
FIG. 3 is a section similar to FIG. 2 but of a double-vane embodiment of the invention.

The rotary valve 9 comprises, as its main component, a rotary piston 10 which, in the embodiment shown in FIG. 2, is formed with a single vane formation 11 and in the other embodiment of FIG. 3 has two diametrically opposite vane formations 11 and 11'. This rotary piston 10 is rotatable relative to the shaft 3 and can rotate relative to the latter about the axis 1.

Two recesses 12 and 13 are provided in the rotary piston 10. The upper recess 12 (FIG. 2) and the upper left recess 12′0 (in FIG. 3) can register with the outlet 7 in the connecting flange 6 and are constituted as blind bores, having exclusively a balancing function. Diametrically opposite the recess 12 is an outlet 13' of a medium flow passage 13 which can register with the other outlet 8 in the connecting flange 6. At its inlet side, the medium flow passage 13 opens centrally in the passage 4. At its outlet side, the outlet 13' of the passage 13 is off center (FIG. 1). The passage 13 is inclined to the axis 1 between its inlet and its outlet.

To generate the sealing effect, as can be seen from FIG. 1, the upstream pressure surface 14 of the rotary piston 10, which is surrounded by a sealing ring 15 against the shaft 3, has a larger surface area than the downstream end face 16 abutting the flange 6 so that a net axial force, resulting from the pressure of the flowable medium, is applied to the left when the flowable medium is under pressure in the system.

A spring 41 seated against the shaft 1, presses an annular shoe 42 against the surface 14 of the piston 10 when the system is not fully pressurized by the medium to provide a mechanical force sealing the rotary piston axially with respect to the passage 4 and against the flange 6. Thus a mechanical prestress applies the rotary piston 10 to the left.

Between the peripheral surface 18 of the rotary piston 10 (FIGS. 2 and 3) from which the vane formation 11 extends (FIG. 2) or the two diametrically opposite vane formations 11 and 11' extend (FIG. 3) and the inner surface 19 of the shaft 3, which are spaced from one another by the rotary distance a, a single working compartment 20 is provided in the single vane construction of FIG. 2 or two working compartments 21 and 21' are provided in the double-vane embodiment of FIG. 3. In the first case, a single sealing bar 24 delimits the ends of the single compartment (FIG. 2) whereas in the embodiment of FIG. 3, two sealing bars 24 and 24', located diametrically opposite one another, delimit the ends of the two compartments 24 and 24'.

The compartments 21 and 21' define approximately the limits of angular movement of the vane formations 11 and 11'.

The fluid which displaces the rotary piston 10 can be simply compressed air. Compressed air pressure can be applied to the working compartment 20 between the end faces 23 and 23' of the sealing bar 22 and the respective side of the vane formation 11 to drive the rotary piston in the respective sense. The sealing bar 24 has the form of a curved block with a radial height a so that it, in the radial direction, bridges the opposite walls of the working compartment 20, and a length 1 (FIG. 1) which can correspond to the total length of the peripheral surface 18 of the piston 10 and seal thereagainst. The sealing bar 24 is secured by means of a screw 25 on the shaft 3.

In the embodiment of FIG. 2, two openings 26 and 26' from respective control fluid passages open into the compartment 20. Between the stop pins 22 and 22' and the end surfaces 23 and 23', respectively, so that compressed air can be delivered to either side of the vane formation 11 and vented from the other side utilizing conventional control valve means and a compressed air source connected to these openings.

In the embodiment of FIG. 2, the compressed air passages include radially-extending passages 28 and 28' in the rotating and stationary machine parts, respectively, which are interconnected by annular grooves 29 on the cylindrical outer periphery of the shaft 3. The annular grooves are provided with gap seals 30 between them (FIG. 1).

In the embodiment of FIG. 3, the fluid feed passages 28, 28' and the annular grooves 29 are provided pairwise on opposite sides. The sealing bars 24 and 24' lie diametrically opposite one another and are also connected by screws 25 with the shaft 3.

In addition to the sealing bars 24 and 24', stop pins 31 and 31' can be provided to define the end positions of the rotary piston. The stop pins can be composed of polyamide so as to resiliently but elastically resist impact.

In the embodiment of FIG. 3, moreover, the axially-extending fluid passages 26 and 26' lie, as viewed in the direction of the axis 1, beneath the sealing bars 24 and 24' in a recess so that the control fluid, preferably compressed air from the passages 28 and 28', can reach the working compartments 21 and 21'.

Figure 4:
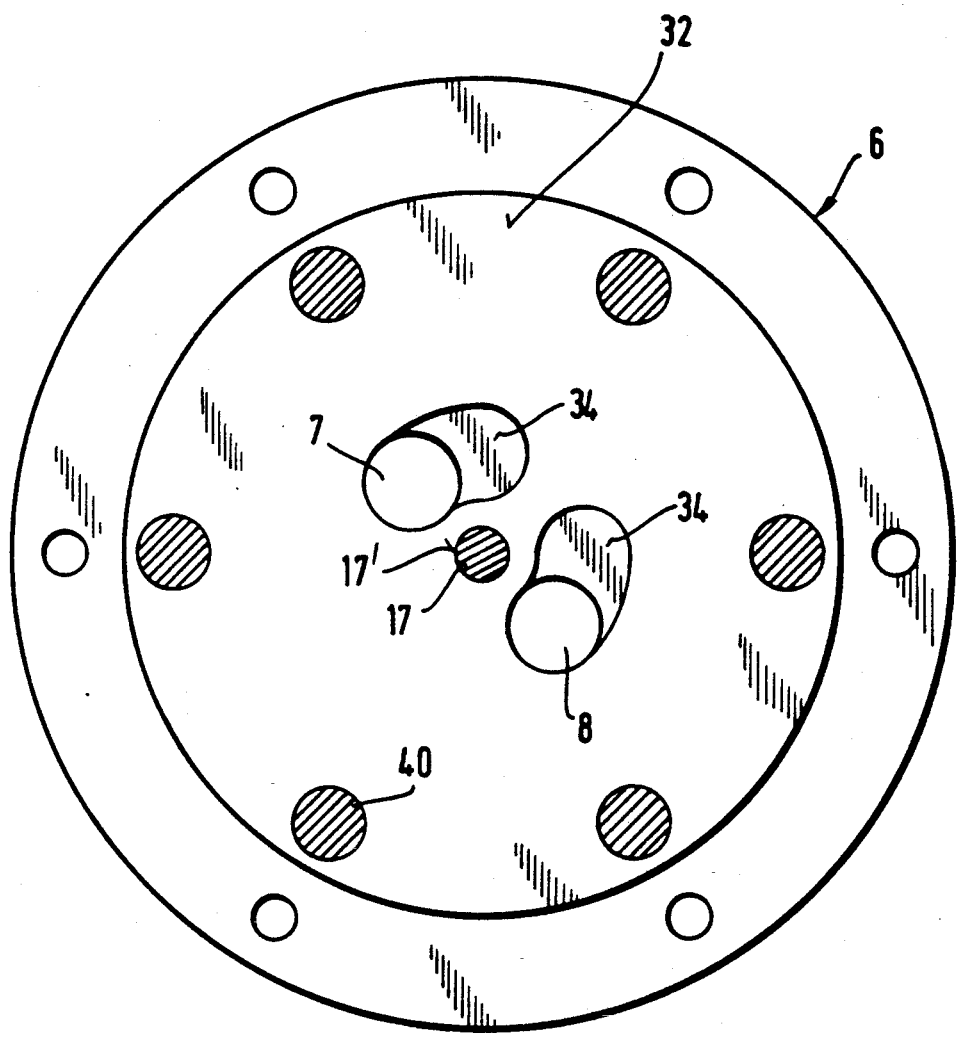
FIG. 4 is an elevational view of the closure flange in the fluid medium flow direction.

FIG. 4 shows in elevation the inner end face 32 (seen in the direction of arrow 33) of the closure flange 6. It can be seen that elongated kidney-shaped curved recesses 34 can communicate with the outlet 7 and 8 for delivering the coolant to the respective outlet depending upon the angular position of the rotary piston. This construction is particularly effective for double-vane rotary valves in which the angular displacement of the valve member may be less than 180° while the outlets 7 and 8 can be angularly offset at 180° from one another. The fastening screws 40 attach the flange 6 to the shaft 3.

In operation of the embodiment of FIG. 3, the illustrated position of the rotary piston 10 can be considered the starting position. Compressed air is fed as represented by the arrow P' from the respective passages 28, 28' against the surfaces 35 and 36 of the vanes 11 and 11' to rotate the piston 10 in the counterclockwise sense represented by the arrow 37 until the leading surface 38 of the vane 11' abuts the stop pin 31'. Via the air connection 39 and passage 28'', the air is vented. This rotary motion of the piston can connect the passage 13', formerly connected to the outlet 8, to the outlet 7.

Conversely, pressurization through port 28'' can rotate the piston 10 in the clockwise sense until it returns to the position shown in FIG. 3, thereby again connecting the opening 13' with the outlet 8'. It is assumed that the outlets 7 and 8 are connected to the socket for the two for supplying the latter axially or in an off-center manner with the fluid depending upon the type of tool provided. The switching is effected when the machine is at standstill or while the shaft 3 is slowing down, so that the axial force upon the rotary piston in the direction of the flange is reduced. When the fluid medium is resupplied at full pressure, the axial force is sufficient to hold the piston 10 against the flange 6 so that acceleration of the shaft will not cause the pistol to lag behind.

We claim:

1. A machine-tool assembly for supplying a flowable medium, said assembly comprising:
    a stationary machine part;
    a hollow shaft member rotatable about an axis of said shaft member in said stationary machine part;
    means on said stationary machine part for feeding said flowable medium to an upstream end of said hollow shaft member whereby said flowable medium flows toward a downstream end of said shaft member for delivery;
    a connection flange member affixed to said downstream end of said hollow shaft member and rotatable therewith for connection of a tool to said assembly, at least one of said members being formed with two outlets selectively receiving said flowable medium; and
    a fluid-actuated rotary distributing valve in a region of said connection flange member and interposed between said hollow shaft member and said outlets and angularly displaceable for connecting a selected one of said outlets to said downstream end of said hollow shaft member in response to a fluid pressure applied to said distributing valve.

2. The assembly defined in claim 1 wherein said fluid-actuated rotary distributing valve is at least in part received in said hollow shaft member at said downstream end.

3. The assembly defined in claim 1 wherein said fluid-actuated rotary distributing valve is at least in part received in said connection flange member.

4. The assembly defined in claim 1 wherein said fluid-actuated rotary distributing valve includes a rotary piston received in said downstream end of said hollow shaft member and rotatable about said axis, said piston being formed with at least one medium-flow passage inclined to said axis and selectively alignable with said outlets upon rotation of said piston, and at least one vane formed on a periphery of said piston, said periphery of said piston being radially spaced from an inner surface of said shaft member to define a compartment pressurizable with said fluid to drive said piston in a sense causing said passage to register with one of said outlets.

5. The assembly defined in claim 4, further comprising at least one sealing element on said inner surface and delimiting said compartment, two ports sealed with respect to one another and for said fluid opening in a region of said sealing element into at least one compartment defined between said piston and said hollow shaft member.

6. The assembly defined in claim 4 wherein said piston has a downstream transverse surface axially spaced from an upstream transverse surface in a direction of flow of said flowable medium through said piston, said upstream surface of said piston being pressurizable with said medium and having a greater surface area than a downstream sealing surface of said piston.

7. The assembly defined in claim 4, further comprising ports formed in said stationary machine part for supplying said fluid, circumferential grooves formed in said piston and communicating with said ports, said circumferential grooves communicating with said compartment, and gap seals sealing said circumferential grooves.

8. The assembly defined in claim 4, further comprising at least one recess formed in said piston for rotational balancing thereof.

9. The assembly defined in claim 4, further comprising at least one abutment pin in said compartment engageable by said vane upon rotation of said piston.

10. The assembly defined in claim 9 wherein said pin is composed of an elastic damping material.

11. The assembly defined in claim 4 wherein said piston is formed with two diametrically opposite vanes.

12. The assembly defined in claim 11 wherein said flange member is formed in a surface engaging said piston with elongated recesses communicating with said outlets.

13. The assembly defined in claim 12 wherein said recesses are kidney shaped.

* * * * *